SQUELCH CIRCUIT

Filed May 23, 1963

INVENTOR.
DONALD P. KURTZ

BY

Browne, Schuyler and Beveridge
ATTORNEYS 3,323,066
Patented May 30, 1967

3,323,066

SQUELCH CIRCUIT

Donald P. Kurtz, Morris Plains, N.J., assignor to Aircraft Radio Corporation, Boonton, N.J., a corporation of New Jersey Filed May 23, 1963, Ser. No. 282,683
8 Claims. (Cl. 325—403)

This invention relates to a radio receiver circuit and, more particularly, to a squelch circuit for a communications receiver.

Conventionally, a squelch circuit is employed in the audio frequency section of a sensitive radio receiver to disable the receiver when no signals are being received. An object of the present invention is to provide a squelch circuit which opens the audio section of a highly sensitive receiver as a function of the output of the detector stage of the receiver and the automatic gain control voltage so that the squelch may be adjusted to operate on both strong and weak signals. A further object is to provide a squelch control which is relatively insensitive to supply voltage variations.

The invention features a squelch controlled amplifier which may form the first audio amplifier stage and this stage is normally biased to cut off condition. The squelch control voltage is derived from the automatic gain control voltage and the direct current component of the detector output. A combining and proportioning circuit combines the automatic gain control voltage with a selected percentage or proportion of the direct current component of the detected signal voltage so that the squelch circuit may be set to control the audio stages of the receiver over substantially the entire range of input signals to the receiver.

The invention is particularly adaptable to communication receivers in which there is available a delayed automatic gain control voltage so that low level signals are not attenuated by the AGC action.

Other objects, advantages and features of the invention will become apparent from the following description taken in conjunction with the accompanying drawings wherein.

Figures 1, 2, 3:
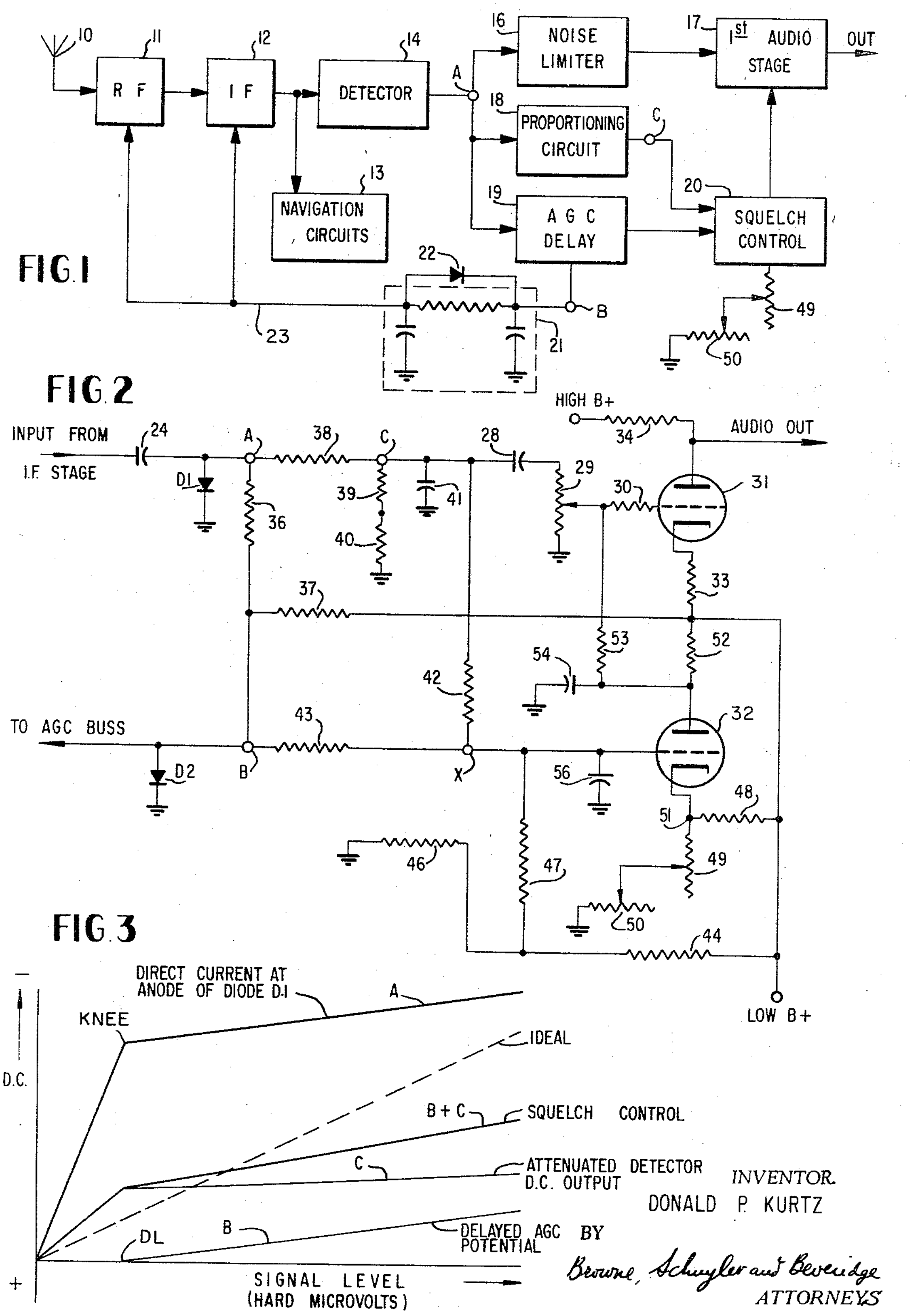
FIG. 1 is a block diagram of a communications receiver incorporating the invention.
FIG. 2 is a detail schematic of the squelch circuit.
FIG. 3 is a signal level (in microvolts) versus voltage as developed at designated points in the circuit illustrated in FIG. 2.

As shown in the block diagram of FIG. 1, signal energy is picked up by the receiving antenna 10 and is fed through a high frequency RF section 11 where it is amplified and mixed in a conventional way to produce an intermediate frequency (IF) signal which is coupled to intermediate frequency (IF) amplification stages 12. The output of the intermediate frequency amplifier stages 12 may be coupled to navigation circuits 13 to produce navigation information. The detector 14 detects the audio communication signals which are fed through an automatic noise limiter 16 to a first stage of audio amplification 17. At the same time, the output of the detector is fed to a proportioning circuit 18 and the automatic gain control circuit 19. One output of the automatic gain control circuit 19 is combined with the output of proportioning circuit 18 to control the squelch control circuit 20 and the squelch control circuit 20 controls the first stage of audio amplification 17 to close and open the audio circuit in accordance with the presence or absence respectively of a signal. Another output of the automatic gain control circuit 19 is fed through a filter circuit 21 and an expansion diode 22 to apply automatic gain control voltage to the AGC buss 23 to control the gain of RF and IF stages 11 and 12. As will be explained more fully in connection with FIG. 2, the automatic gain control voltage developed in block 19 is delayed so that weak signals are not attenuated by the automatic gain control voltage. The expansion diode 22 is so poled that a sudden increase in signal strength causes the diode to conduct thereby shunting the resistance of the AGC filter thus changing the time constant of the filter so that these rapid changes are immediately felt in the stages under automatic gain control.

In FIG. 3 input signal level (in hard or open circuit microvolts) is plotted along the abscissa. Negative D.C. voltages as taken at points A, B and C of FIG. 1 are plotted along the ordinate. Curve A is a plot of the D.C. output of the detector diode D1; curve B is a plot of the delayed automatic gain control voltage; curve C is a plot of a selected percentage of curve A; and curve B plus curve C is a plot of the squelch control voltage as derived from the AGC voltage added to the D.C. component of the detector output.

Referring now to FIG. 2, the IF signal from the final IF stage is coupled by coupling capacitor 24 to diode detector DI which is so poled that the direct current component of the detected signal appearing at point A is negative with respect to ground (it should be noted that the curved plot of 3 are inverted and are actually negative values). Circuit details for noise limiter 16 have been omitted from FIG. 2 because the noise limiter circuit is conventional. The alternating current voltage at point A is coupled to the first stage of audio amplification through a direct current blocking capacitor 28, volume control potentiometer 29 and grid resistor 30 to the grid circuit of tube 31. The direct current bias potential on the grid of tube 31 is controlled by squelch control tube 32 in a manner to be described more fully hereinafter. It should be noted however that the cathode of tube 31 is connected through cathode resistor 33 to the positive plate supply for the squelch control tube 32 and that the plate of audio amplifier tube 31 is connected through a plate load resistor 34 to a plate supply for tube 31 which supply is of a higher positive potential than the plate supply for squelch tube 32.

The direct current component of the output of detector diode D1 is coupled through a resistor 36 to the anode of clamping diode D2. The anode of diode D2 carries a small delay bias potential from the positive plate supply of tube 32 through a relatively large resistor 37 so that the gain control voltage coupled to point B from point A must rise above the delay AGC potential on clamp diode D2 before there is any automatic gain control action. In other words, the signal level must be above the delay level (indicated at DL on FIG. 3) before there is any attenuation of the signal by the automatic gain control circuit. This is conventional delayed automatic gain control.

The direct current component of the signal developed by the detector D1 is applied to a voltage divider comprising resistors 38, 39 and 40 with the resistors being so proportioned that the direct current (average D.C.) component of the voltage appearing at point C is a selected percentage (preferably less than 50%) or proportion of the direct current component of the voltage appearing at point A. A bypass capacitor 41 filters out the high frequency signal and, as mentioned earlier, coupling capacitor 28 passes the audio frequency signal through potentiometer 29 to the grid circuit of the first audio frequency amplifier 31.

The attenuated direct current component of the signal appearing at point C is passed by decoupling resistor 42 to the grid circuit of squelch control tube 32. Likewise, the delayed automatic gain control voltage appearing at point B is passed to the grid circuit of tube 32 through decoupling resistor 43 so that the attenuated direct current component of signal appearing at A and the delayed automatic gain control voltage are combined at point X to form the squelch control voltage for squelch tube 32. This is represented as curve B plus C on FIG. 3 and is the sum of the attenuated detector signal and the delayed automatic gain control voltage.

A voltage divider comprising resistors 44 and 46 is connected across the low B+ supply with the intermediate point of the voltage divider connected through a decoupling resistor 47 to the grid circuit of tube 32. An adjustable voltage divider comprising resistor 48, adjustable potentiometer 49 and adjustable potentiometer 50 is connected across the low B+ supply and its intermediate point 51 is connected to the cathode of squelch control tube 32. The plate of squelch control tube 32 is connected through a load resistor 52 to the plate supply therefor. The plate voltage of squelch control tube 32 is coupled through resistor 53 to the grid circuit of the first audio amplifier tube 31. A bypass capacitor 54 prevents any RF energy in squelch control tube 32 from contaminating the input to audio amplifier 31 and, for similar reasons, alternating current is bypassed on the grid of tube 32 by a bypass capacitor 56.

Intially, potentiometer 50, which is the range control for squelch tube 32 is adjusted by the technician in aligning the equipment. Potentiometer 49 is adjusted by the user or operator to the desired squelch threshold level. These two adjustments of potentiometers 49 and 50 determine the positive DC potential at intermediate point 51 of the voltage divider connected to the cathode of tube 32. Thus, with the grid being coupled to the intermediate point of voltage divider 44–46 and the cathode coupling being tied to the intermediate point 51 of voltage divider 48–50, squelch control tube 32 is therefore initially conducting. The current flowing through tube 32 causes a drop across the plate load resistor 52 so that the plate of tube 32 is negative with respect to the low voltage plate supply therefor. The negative voltage is applied to the grid of the first audio amplifier through coupling resistor 53 and grid resistor 30 to the first audio amplifier tube 31 thus biasing tube 31 out of plate current conduction. Thus, the audio circuit is open initially in a no-signal condition. When a signal enters the receiver and has a signal level below the point which initiates the delayed automatic gain control this signal is developed at point A and applied to the voltage divider comprising resistor 38, 39 and 40. The voltage at intermediate point C is applied through resistor 42 to the control point X of squelch control tube 32. Due to the poling of detector diode D1 this is a negative voltage and if it is of equal or larger magnitude than the preset bias potential on squelch control tube 32, it will cause squelch control tube 32 to cut off so that the plate potential thereof will rise towards the low voltage supply. This rising voltage then biases tube 31 in a direction to conduct thus opening the audio circuit. However, should the proportion of the signal voltage developed at point C be below the threshold voltage set by potentiometers 49 and 50, tube 32 will remain conducting thus maintaining the audio circuit disabled. Thus, whenever the signal level is in a region which is below the knee of curve A, the squelch control tube is under control of the direct current component signal developed at point C. It wil be noted that as just described, squelch control tube 32 operates as a direct current amplifier to control the grid bias of tube 31.

The specific percentage or proportion of the direct current component of signal at point A that is combined with the automatic gain control voltage developed at point B is determined largely by the parameters of the receiver in which the circuit is used. In general, however, the direct current component of signal at point A is attenuated more than 50% prior to being combined with the delayed automatic gain control voltage developed at point B.

When the level of the signal received by the receiver rises above the knee of the automatic gain control curve, curve A, the entire automatic gain control voltage is combined with a portion of the direct current component of the signal voltage, developed at point C and this voltage is used as the control voltage for squelch control tube 32. In this way, approximate approach is made to the ideal squelch control voltage and there is effective squelch action before and after the AGC delay.

The squelch control tube 32 is controlled from two separate sources, i.e., proportioning circuit 18 and AGC delay circuit 19. This permits the operation and setting of the squelch control in either region of signal operation, either before the delayed automatic control takes over at signal levels above the knee of the gain control curve, curve A, FIG. 3.

There has been shown and described one illustrative embodiment of the invention as applied to a radio receiver. It will be obvious to those skilled in the art that various modifications and changes may be made without departing from the scope of the invention.

What is claimed is:

1. In a radio receiver having means for detecting an amplified signal and providing a delayed automatic gain control voltage, and a direct current voltage proportional to signal strength, an audio output circuit connected to said means and a squelch circuit connected to said audio output circuit for controlling said audio output circuit, the improvement which comprises, means connected to said squelch circuit for applying thereto said delayed automatic gain control voltage and a portion of said direct current signal proportional to signal strength so as to control said squelch circuit as a function thereof.

2. In a radio receiver having a final output stage, means for demodulating a received signal and producing a direct current voltage proportional to signal strength and a direct current voltage component from the demodulated signal, a squelch circuit connected to said final audio output stage including:

means for attentuating the latter direct current voltage, and means for combining the attentuated signal with the voltage proportional to signal strength to actuate said final output stage of said receiver when the combined voltages are above a selected threshold level.

3. A radio receiver as defined in claim 2 wherein said latter direct current signal voltage is attenuated more than fifty percent.

4. A squelch circuit for controlling a terminal stage of a radio receiver having a detector stage comprising, first means connected to said detector stage for developing a direct current voltage proportional to signal strength when the signal strength is above a given value;

second means connected to said detector stage for developing a direct current voltage proportional to signal strength;

third means for attenuating the voltage developed by said second means;

fourth means connected to said first and said third means for combining the voltages produced by said first and said third means to control said terminal stage of the receiver when the sum of the combined voltages is above a given threshold level.

5. A squelch circuit as defined in claim 4 wherein said fourth means includes an electronic switch controlling the said terminal stage of said receiver, means associated with said switch for establishing a threshold value therefor, and means for applying the combined voltages produced by said first and said third means to said electronic switch to control same.

6. The squelch circuit defined in claim 5 wherein said means for establishing a threshold value is adjustable.

7. In a radio receiver having a detector and an audio output stage connected to receive audio signals from said detector, said detector producing a direct current voltage proportional to signal strength, a delayed automatic gain control circuit for applying a portion of said direct current voltage proportional to signal strength to at least one gain controlled stage of said receiver when the signal strength is above a selected level as a delayed automatic gain control voltage and a squelch circuit connected to said audio output stage for disabling said audio output stage in the absence of received signals in said receiver, said squelch circuit comprising a control device for controlling the bias on said audio stage, a voltage divider connected to said detector, across which said voltage proportional to signal strength is applied, means connected between an intermediate point on said voltage divider and said control device for coupling a selected portion of the direct current voltage across said voltage divider to said control device, and means connected between said delayed automatic gain control circuit and said control device for coupling said delayed automatic gain control voltage to said control device, whereby the bias on said audio stage is controlled by the combined effect of said delayed automatic gain control voltage and said selected portion of direct current voltage proportional to signal strength.

8. The radio receiver as defined in claim 7 wherein said control device is a direct current amplifier.

No references cited.

KATHLEEN H. CLAFFY, *Primary Examiner.*

R. LINN, *Assistant Examiner.*